Feb. 12, 1929.  C. W. METZGER  1,701,895

CORE BIT

Filed Dec. 20, 1926

INVENTOR.
Claude W. Metzger,
BY
Hardway Cathy
ATTORNEYS.

Patented Feb. 12, 1929.

1,701,895

UNITED STATES PATENT OFFICE.

CLAUDE W. METZGER, OF HOUSTON, TEXAS.

CORE BIT.

Application filed December 20, 1926. Serial No. 155,847.

This invention relates to new and useful improvements in a core bit.

One object of the invention is to provide a bit of the character described, specially designed for attachment to the lower end of a drill stem and for forming a core or sample of the strata being pierced.

Another object of the invention is to provide a core forming bit comprising a tubular body with side reaming blades for reaming out and maintaining the gauge of the bore and at its lower end the core forming blades having cutting edges designed to form a core which will enter and pass through the head into the stem above.

With the above and other objects in view the invention has particular relation to certain novel features of construction, arrangement of parts and use, an example of which is given in this specification and illustrated in the accompanying drawings, wherein:—

Figure 1:
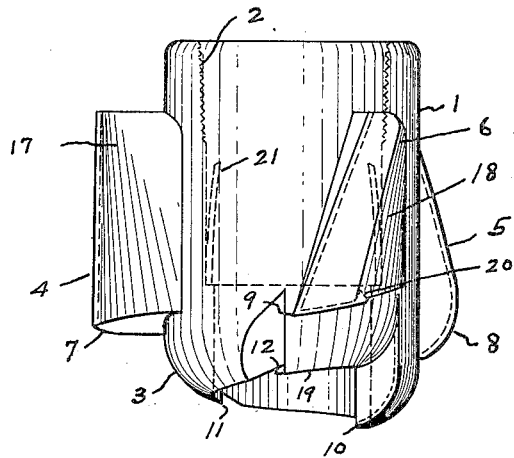
Figure 1 shows a side elevation of the bit.
Figure 2:
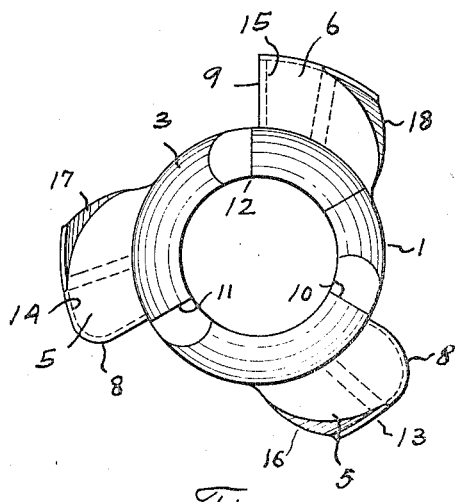
Figure 2 shows a bottom end view thereof.

Referring now more particularly to the drawings, wherein like numerals of reference designate similar parts in each of the figures, the numeral 1 represents a tubular head whose upper end is internally threaded, as at 2, to receive the lower end of the tubular operating stem and whose lower end is reduced, as at 3, and is rounded off. The head has the side reaming blades, designated respectively, by the numerals 4, 5, and 6, which are disposed at a forwardly inclined angle, as shown, and whose lower or cutting edges are disposed spirally relative to each other. The lower end of each blade terminates in a cutting edge designated respectively by the numerals 7, 8, and 9. The blades 4, 5 and 6 extend the same radial distance from the axis of the head. The forward or cutting edge 8 of the blade 5 is arcuate so that as the bit rotates this cutting edge will form a cut, in the wall of the bore, concaved in cross section. The following cutting edge 7, of the blade 4 extends out radially from the head for a distance, but has its outer corner arcuate, or rounded off as shown in Figure 2, which will cut into the concaved groove or cut made by the cutting edge 8 and remove material therefrom and thus deepen the cut. The cutting edge 9, of the blade 6 extends, throughout its length radially from the head forming, at the outer end of said edge a sharp angle which will extend deeper into the cut left by the cutting edge 7 so that the material being cut from the wall of the bore will be gradually cut away. The cuts made by the edges 8, 7 and 9 will be spiralled inasmuch as the bit head gradually moves downwardly as it rotates. The lower end of the head is formed with core forming blades, or cutters 10, 11 and 12, whose cutting edges are disposed in spiralled relation and the cutting edges are preferably arcuate. While these cutting edges are of standard gauge, the cutting edge 10 will do all of the cutting for the blades 11 and 12 but this cutting edge 10, by reason of that fact, will rapidly wear away, thus leaving part of the material to be removed by the succeeding blade 11 and as this blade 11 wears away it in turn will leave certain of the material to be removed by the succeeding cutting blade 12. The bit is thus very efficient in maintaining the gauge of the bore. The forward sides of the reaming blades 4, 5 and 6 are faced with hard durable material, as 13, 14, 15 but the rear parts of said blades as 16, 17, 18 are of softer material. The hard faces are provided so that said blades will not readily wear away to reduce the over all dimensions of the bit so that the gauge, or diameter of the bore may be maintained substantially uniform as the work proceeds downwardly and for the same reason the lower end of the blade 6 is also faced with hard material, as at 19, which at the rear side, is keyed into a radial groove 20, in said blade, as shown in Figure 1. The cutters 10, 11, 12 are also faced with relatively hard material.

Fastened within the bit are the flexible fingers 21 whose lower ends are attached to the bit but whose upper ends are free and inclined inwardly so as to permit the core to pass upwardly between them, said fingers engaging with the core to prevent it from dropping out in withdrawing the bit.

What I claim is:

1. A core forming bit including a tubular head, side reaming blades disposed spirally around the head, whose lower ends terminate in cutting edges, said cutting edges being also disposed spirally relative to the head, the lower end of the head being reduced and rounded off and core forming cutting edges on the reduced lower end of the head, said core forming cutting edges being also disposed spirally relative to the head.

2. A core forming bit including a tubular head, side reaming blades on the head whose lower ends terminate in cutting edges, said cutting edges being disposed spirally around the head and each cutting edge extending out further from the head than the cutting edge preceding it, one of said cutting edges extending, throughout its length, radially from the head, and the outer corners of said other cutting edges being rounded off, core forming cutting edges carried by the lower end of the head and disposed spirally.

In testimony whereof I have signed my name to this specification.

CLAUDE W. METZGER.